United States Patent
Baskey et al.

(10) Patent No.: US 8,108,666 B2
(45) Date of Patent: Jan. 31, 2012

(54) SYSTEM AND METHOD FOR TRANSFERRING USER PREFERENCES

(75) Inventors: Michael Baskey, Wappingers Falls, NY (US); Dinesh Chandra Verma, Mount Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 865 days.

(21) Appl. No.: 12/110,591

(22) Filed: Apr. 28, 2008

(65) Prior Publication Data
US 2009/0271609 A1 Oct. 29, 2009

(51) Int. Cl.
*G06F 1/24* (2006.01)
*G06F 9/00* (2006.01)
(52) U.S. Cl. ....................................................... 713/100
(58) Field of Classification Search .................. 713/100
See application file for complete search history.

(56) References Cited

U.S. PATENT DOCUMENTS

| | | | |
|---|---|---|---|
| 6,446,076 B1 * | 9/2002 | Burkey et al. | 704/270.1 |
| 7,069,091 B2 * | 6/2006 | Williamson | 700/90 |
| 7,340,244 B1 * | 3/2008 | Osborne et al. | 455/414.1 |

OTHER PUBLICATIONS

Pash Adam, Automate proximity and location-based comptuer actions, Jun. 5, 2007, http://lifehacker.com/265822/automate-proximity-and-location+based-computer-actions.*

* cited by examiner

*Primary Examiner* — Mark Connolly
(74) *Attorney, Agent, or Firm* — Tutunjian & Bitetto, P.C.; Preston J. Young

(57) ABSTRACT

A system and method for customizing a device includes identifying a user of a device and determining a profile for the user of the device from a network. The profile includes a record of at least one user preference for a type of the device. The profile is translated to a configuration of the device. The device is modified according to the configuration to permit use of the device with the at least one user preference.

22 Claims, 4 Drawing Sheets

SYSTEM AND METHOD FOR TRANSFERRING USER PREFERENCES

BACKGROUND

1. Technical Field

The present invention generally relates to information technology, and, more particularly, to systems and methods which improve usability of different products and services using information technology.

2. Description of the Related Art

In a large number of situations, the usefulness and comfort of a product or service can be enhanced by customizing that product or service to an optimal degree of performance for an individual user. As an example, a car is always more convenient to drive when its seats, temperature controls and preset music stations are customized according to the preferences of the driver. A bath is more comfortable if the temperature is set to a desired temperature enjoyed by the person taking the bath. A cell-phone is more convenient if the short-cut keys, welcome screen, ring-tone, and preference menu are customized to the preferences of the person using the phone.

Because of the advantages of customizing any product or service, techniques have been developed in the current state of the art, which permit people to customize preferences of their product to their liking. Thus, a driver can change the settings of the car to his desired level, and some smart cars set themselves to the setting of the driver when they recognize the driver by recognizing a key inserted into the ignition. Cell-phones and other devices, once customized, remember their user-specific preferences and maintain those customizations in subsequent power-on restart of those devices.

In many circumstances, people use devices that are not customized to them. When a driver rents a car when traveling, the driver needs to customize the settings of the new car to his preferences. Often, he or she may be unable to do so to his satisfaction. As an example, if the driver wants the first preset channel to be a country music station, he may not know what the right frequency on which such a station is playing in the area that he has rented the car from. Similarly, when a person rents rooms in a hotel, he will have to set the comfort controls of the room to his liking, and may find the new interfaces for adjusting the temperature difficult.

When a person picks up the cell-phone of his spouse to make a call, he needs to deal with the welcome screen, menu options and short-cut keys of his spouse, rather than the ones that he is familiar with. These add to a loss of usability and satisfaction gained from using the device.

SUMMARY

It would be desirable to have a system in which the preferences of a user are automatically transferred to a new device to be used even when that device is not the one that the user normally uses and is not the device that he has customized according to his preferences.

One or more embodiments may provide one or more beneficial technical effects, such as, for example, providing an approach which permits renters of cars to transfer their preferences to any car they are currently renting. Other embodiments may provide an approach which allows guests at a hotel to customize their room comfort settings and bath temperatures to the setting the guest had created earlier. Other alternative embodiments enable a person who borrows a cell phone for temporary access, to automatically customize the cell-phone user interface to provide a personalized environment.

Techniques are provided for transferring user preferences from one device to another or from memory storage to a device. The techniques permit the transfer of a user preference from one device to another device or from memory storage to a device via a network. The user preferences are stored in a canonical representation in a network database, and translation from the canonical representation is used to convert the canonical preferences into the configuration of the device.

A system and method for customizing a device includes identifying a user of a device and determining a profile for the user of the device from a network. The profile includes a record of at least one user preference for a type of the device. The profile is translated to a configuration of the device. The device is modified according to the configuration to permit use of the device with the at least one user preference.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
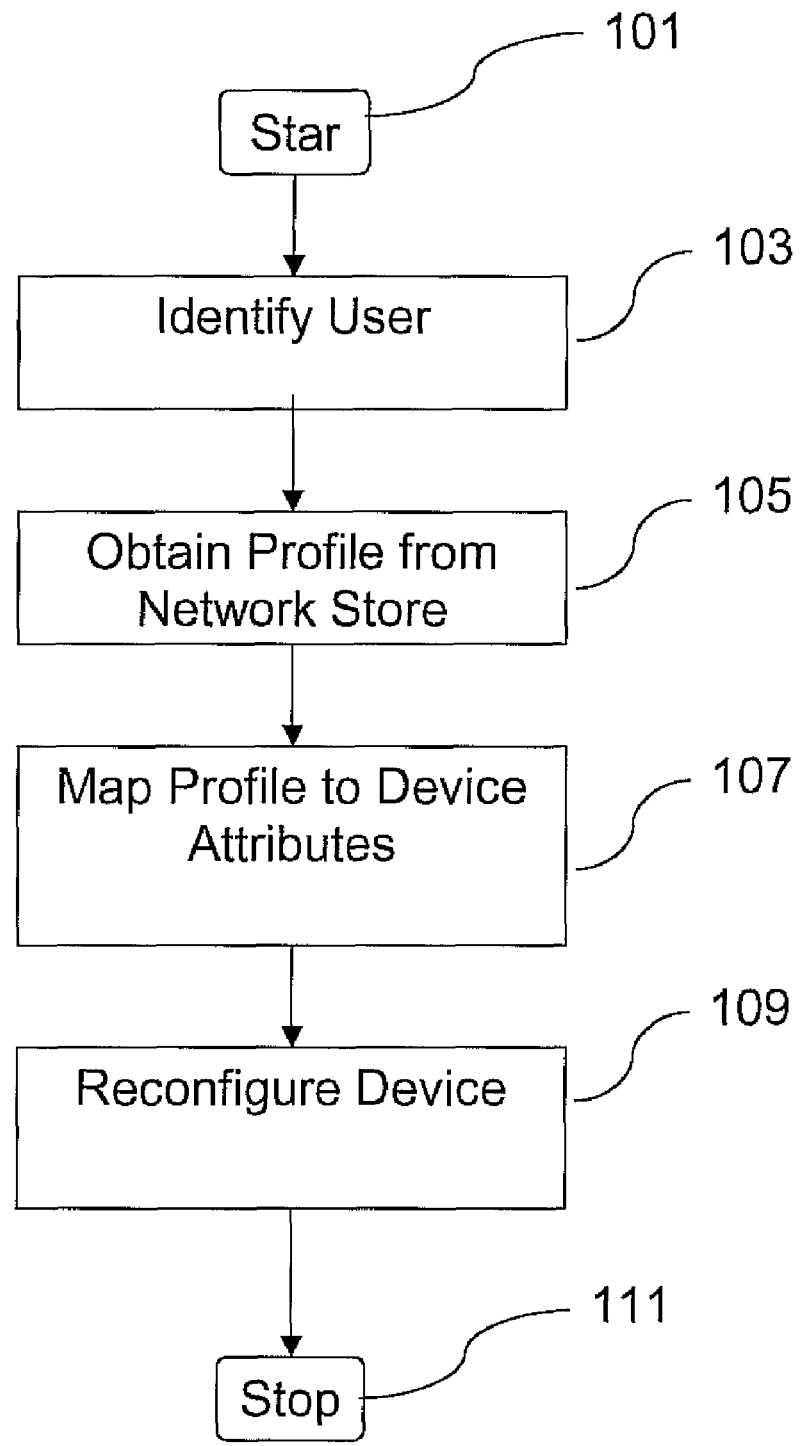
FIG. 1 is a block/flow diagram illustrating a system/method for transferring user preferences to a device, according to one embodiment.

The present principles provide techniques for migrating preferences from one object being used to another instance of that object. A user may create a set of preferences, either explicitly or by customizing an instance of a product or service. These preferences are stored in a network attached storage system. When the user accesses another instance of that product or service, the object identifies the user, and retrieves the preferences for the user from the network attached storage system. The preferences are translated or mapped to a set of settings that the device can best support to match those preferences, and then the device can configure itself in accordance with the specified preferences.

As an example, consider a driver who frequently rents cars from a car rental company. The driver may store his preferences for the interior temperature of the car, and the set of music stations he prefers with a database of the rental company, accessible through a web-based interface. When the driver rents a car from a rental agency, a computer in the car retrieves the preference settings of the user from the car, maps the settings to the set of music stations available within the area where the car is being rented, maps the temperature control settings and station settings to the specific configuration of the make/model of the vehicle being rented. The preferences may be stored in a profile created by the user (e.g., on-line) or at a rental agency in advance. A profile may be created based upon a prior rental where the settings were recorded to create a profile.

As another example, consider a traveler who frequently stays in hotel rooms. The traveler prefers that the temperature of his room be at 75° F., and the rooms have a computer controlled thermostat whose settings permit one to maintain any desired temperature. The hotel has registered this preference of the traveler, because on a previous stay the renter had set that as the value of the room temperature. When the renter visits another hotel, the computer automatically sets the temperature of his room at 75° F. when the room is assigned to the traveler. Similar preferences can be transferred for other comfort settings that are computer controlled, such as intensity of lights in the room, the temperature of the hot water, the firmness of the bed for beds that permit automatic firmness adjustment, or the extent to which shades are left open to let sunlight into the room.

In another example, consider a user who needs to make a call, but the user's cellular telephone is not available. The user can pick up another cell phone which recognizes that the user as different using an identification technique such as biometric finger-print recognition, or by the user typing in the phone number assigned to his original cell phone. The cell phone retrieves the preferences for the user, including the welcome screen settings, the short-cut menu for different commands, and any other settings needed from the network. This gives the user the same familiar interface for making the call as if the user had picked up his own phone. This feature is implemented even if the phones are of different make and model.

As yet another example, consider a hypothetical snow-thrower which has a computer controlled means for adjusting the length of the handle. Two snow-throwers are used by two different users to clear snow. The users have each set their desired preferences of handle-length on their individual snow-throwers. However, the snow-thrower can automatically identify the new user, and copy the preferences from one snow-thrower to another by communicating with a preference server over the network.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram shows a system/method for transferring user preferences to a device in accordance with one illustrative embodiment. In block 101, a method is initiated by a device when a user attempts to use the device. This may include turning the device on or a set action or trigger based on a user action. In block 103, an identity of a user is determined or obtained. This may include using biometrics (eye scan, fingerprints, voice recognition, code entry, etc.). In block 105, a profile of the user is obtained from a storage system connected to the device via a network. The network may be any suitable network from a local network (e.g., peer to peer) to a global network (e.g., the Internet). The network is preferably a wireless network and may include a cellular network, a home network, a powerline network with wireless capabilities, a satellite network or any other network capable of performing the functions as described herein.

In block 107, the profile is mapped to the settings and capabilities (attributes) of the device. For example, the device to be configured may not have of the adjustment capabilities to meet all of the preferences stored in the user's profile. The mapping may provide a subset of the preferences or substitute configurations to attempt to meet all of the preferences for that type of device. This may include setting other parameters to simulate an affect or feature. This may be performed using a table or matrix. In block 109, a configuration of the device is changed in accordance with the profile of the identified user. In block 111, after a predetermined amount of time after use, the device may be restored to its default settings or in accordance with a default profile.

In one embodiment, the device may be a cellular telephone. A user may temporarily need to access a cell phone that is not his or her own. Such a situation may arise if a cell phone company provides a temporary cell phone to one of its usual subscribers to use overseas where different cell phone protocols are supported, or when the subscriber happens to pick up another convenient cell phone belonging to one of his/her friends, family, etc. and wants to use that phone. In either case, the user is present as a subscriber in the records of the cell phone company and identified by his cell phone number or a user identity. The user has stored his preferences for the cell phone shortcuts and configurations into a database maintained by the cell phone company.

In block 101, the user turns on the device. In block 103, the user provides his identity to the cell phone device. The identification may be done by the user selecting an option on the cell phone, and requesting that the telephone adopt the settings of a telephone number associated with the individual. The cell phone may connect with a network authentication server of a cell phone provider and validate that the number entered is one of the numbers associated with a family plan, group or is otherwise acceptable from a security stand point, and thus switching of preferences to that of the new user is advisable. Other restrictions or policies may also be used to ensure security or provide convenience.

In other embodiments, other means for validating the authority of the user to customize the device at hand may be used, e.g., if a cell phone is being rented, the user may be asked to provide a password authenticating their use. Subsequently, in block 105, the cell-phone connects to a network attached database which has stored the preferences of the user. The preferences may include short-cut keys, display options and other information which the user is accustomed to having in their environment. These preferences are downloaded to the cell phone device in block 105.

In block 107, the cell phone device takes the preferences and determines the type of changes in its local configuration that will reflect the preferences of the user. In block 109, the cell phone performs the customizations. Thus, the cell-phone will present a welcome screen and short-cut keys that the user is accustomed to, and enable the user to have customized preferences and a better experience of use.

Figure 2:
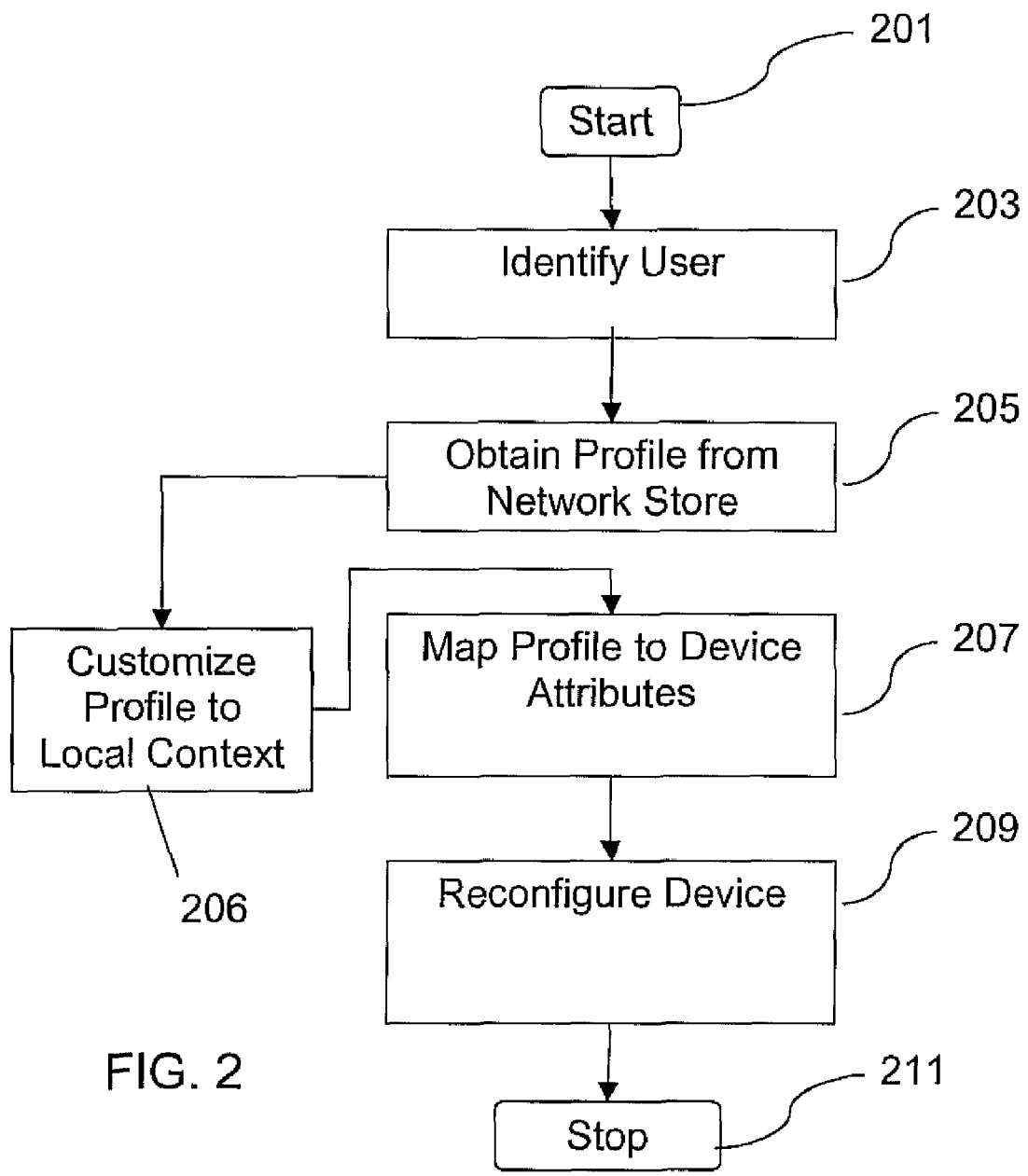
FIG. 2 is a block/flow diagram illustrating a system/method for transferring user preferences to a device using local context information, according to another embodiment.

Referring to FIG. 2, a block/flow diagram shows a system/method for transferring user preferences to a device, according to another embodiment of the invention. The system/method is initiated in block 201 by a device when a user attempts to use the device. Block 203 includes determining or obtaining the identity of the user. Block 205 includes obtaining the profile of the user from a storage system connected to the device via a network. Block 206 includes customizing the profile obtained for the user to a local context. A local context may include mapping user preferences to the preferences specific to a local geography, to the specific organization or environment (time of day or night, etc.) in which the user or the device may be operating (e.g., local context). Block 207 includes mapping the profile to the settings and capabilities of the device. Block 209 includes changing the configuration of the device.

In one embodiment, the device may be an automobile, and the application of this embodiment to the case of automobile rental is illustratively described. The context of the automobile rental application is that of a car renter who frequently rents automobiles from a car rental company. The renter is registered in a frequent renter program or similar program of the rental company. The renter has entered his preferences for desired music and news stations into a database that maintains the information about his rental.

The steps in FIG. 2 are followed for automatically configuring the music stations in the automobile that the renter is assigned to. Block 201 is entered when a car that is rented is started by turning the key in the ignition, picking up the car at a car rental location, entering a code in the car's computer or any other initiating event. In block 203, the car sends its vehicle identification number or other identification information to a network database of the car rental company. The database of the car rental company uses the vehicle identity information, associates the information with its rental records to determine the identity of the renter, and then uses the identity of the renter to determine if the renter has stored any preferences about its music station (or other settings, e.g., seat settings, temperature or climate settings, etc.) in block 205. Such preferences may include geographic coordinates entered into a navigation system so that upon entry of the vehicle the user has a hotel or other destination set into a navigation system in the vehicle. The database then sends the preferences of the user back to the car.

In block 206, the car determines its location, which can be done by means of global positioning satellite (GPS technology which is known in the art, or via the information included in the rental record of the car, or via a user-specified preference. The type of music stations that are available in the geographic area and the frequencies on which they are being transmitted are collected by the car. The car then maps the preferences of the renter to the specific channels that are being broadcast in the area in block 207. In an alternative embodiment, the car may scan all the channels being broadcast in the location it is being driven in, and map the control information in radio broadcasts identifying itself to the preferences of the user.

In block 209, the car configures the settings of its radio so that the channels are programmed to music stations that are in accordance with the preferences of the user. The procedure then terminates in step 211. In alternate embodiments, the procedure of FIG. 2 may be executed only when the car is rented, and the car reconfigures itself only when the car is rented out to another person. In yet another alternative embodiment, the car may remember the GPS location at which it programmed itself last, and the reconfiguration procedure is invoked only after the automobile has moved a certain distance away from the position that the system was initially programmed with. Other variations may also be used to determine when the reconfiguration procedure of the car may be used.

The above embodiment was presented to change the settings of the radio station of the car. Other embodiments may use this technique to support automatic adjustment of car-seats to suit the height and width of the user, the automatic setting of the temperature inside the car, or any other setting within the automobile that can be controlled by a computing device.

In other embodiments, the user may be renting rooms at a hotel chain. The operator of the hotel can use preference information to customize settings when a room is rented by a person whose preferences can be identified such as by their enrollment in a membership program. Settings being customized may include the temperature controls of the room, temperature of bath water, intensity of lights in the room, customization of preset channels on entertainment systems in the hotel, etc.

Figure 3:
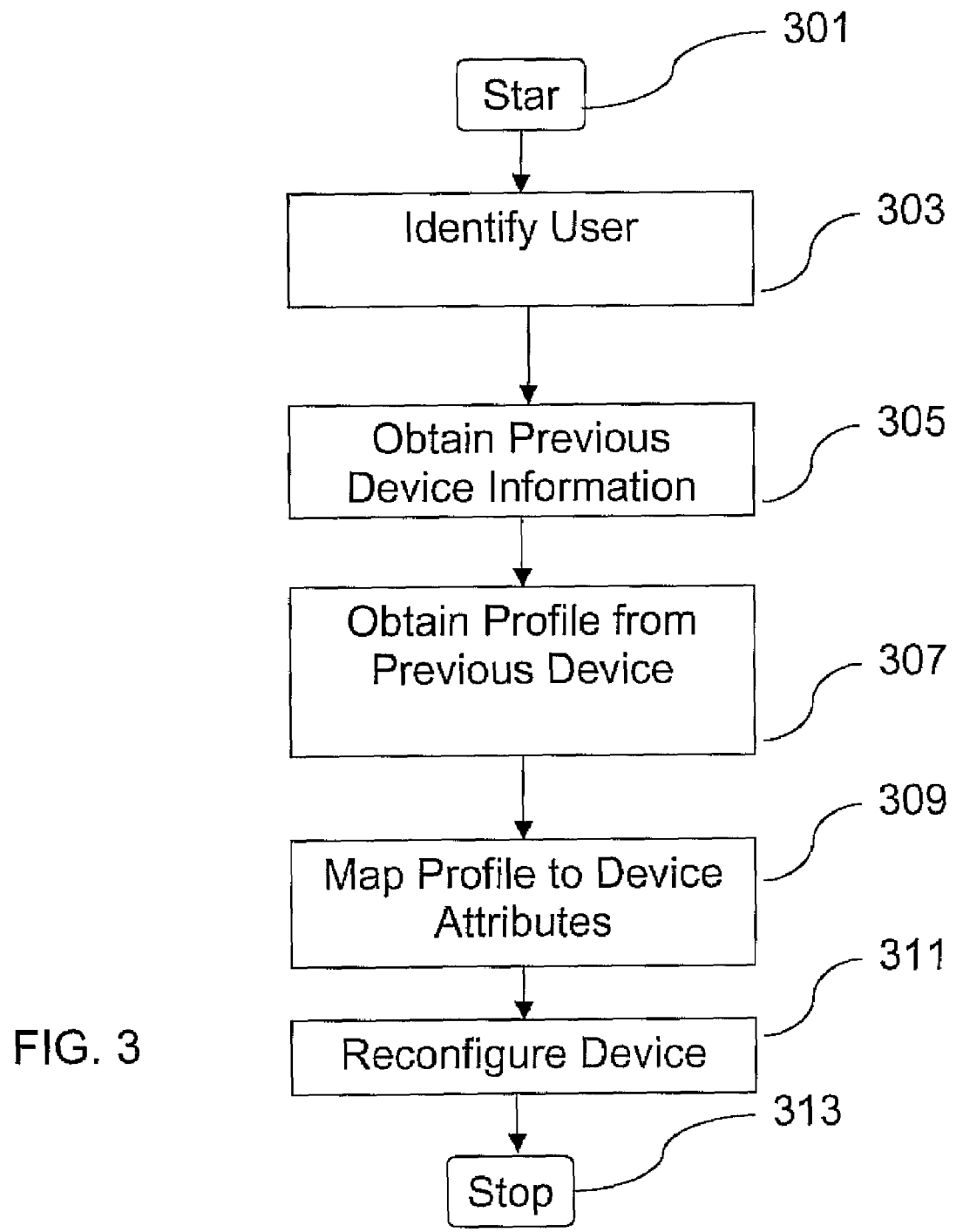
FIG. 3 a block/flow diagram illustrating a system/method for transferring user preferences to a device from another or previous used device, according to yet another embodiment.

In another embodiment, the profile and preferences of a user may be obtained from another device in the network. FIG. 3 shows a block/flow diagram of an embodiment when such a mechanism is used for transferring the information.

Referring to FIG. 3, a block/flow diagram shows a system/method for transferring user preferences to a device, according to another illustrative embodiment. The system/method is initiated in block 301 when a user attempts to first use a device. Block 303 includes a first device obtaining the identity of the user. Block 305 includes obtaining information from the network about a second device which may store a user profile. In one embodiment, this second device could be the device the user normally uses or its home device. In another embodiment, the second device may be the device that user last used, or a device that the user may have used sometime in the past.

In block 307, the first device connects to the second device to obtain the profile of the user through a network. The profile includes the preferences of the user in customizing a device to its use. Block 309 includes mapping the profile to the settings and capabilities of the first device. Block 311 includes changing the configuration of the first device to match the profile of the user. The system/method terminates in block 313.

As an example of this embodiment, consider a landscaping company where workers come and check out equipment such as snow throwers, which have adjustable handle length. In block 301, an employee of the company checks out a snow-thrower, and the snow-thrower identifies the employee checking out the device by accessing a database which stores information about such rentals in block 303. In block 305, the snow-thrower sends out a broadcast message on a wireless network connecting all the snow-throwers looking for the last snow-thrower the same employee had used. After learning that identity, in block 307, the snow-thrower obtains the length of the handle setting used by the employee in the previous rental. In block 311, the snow-thrower adjusts its handle to the specific height, after making any adjustments for differences in the make and models of the previous snow-thrower in block 309. The procedure then terminates in block 313. In alternate embodiments, the preferences may be adjusted for other devices, such as any device with adjustable settings that are customized specifically for a user. it should be understood that the devices may report there settings to each other or to a database on the network.

Figure 4:
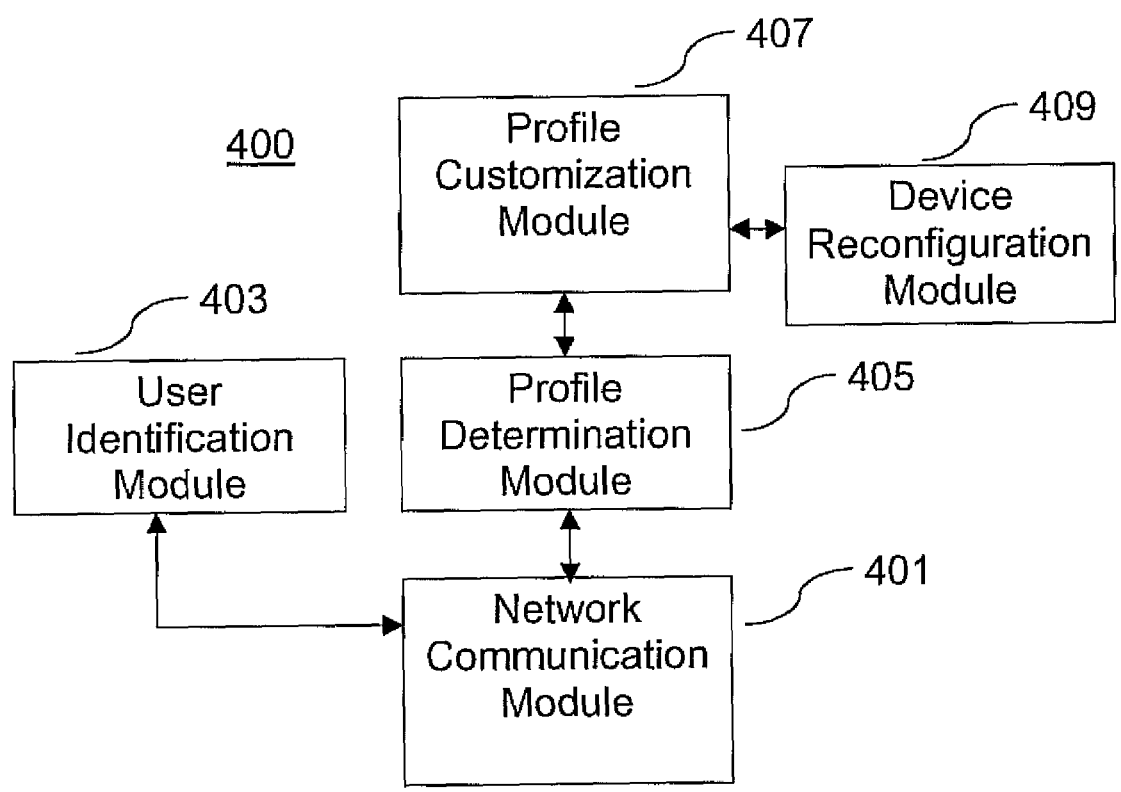
FIG. 4 is a block diagram of an exemplary system on which one or more embodiments can be implemented.

Referring to FIG. 4, a system 400 illustratively depicts mechanisms needed to transfer user preferences from one device to another. The system 400 may be distributed/located at a configurable device, on a network connected to that device or a combination thereof. The system 400 includes a user identification module 403, a profile determination module 405, a profile customization module 407 and a device reconfiguration module 409, which are able to communicate to external devices using a network communication module 401. The user identification module 403 is responsible for recognizing the identity of the user accessing a device, and may employ the services of the network communication module 401 to complete its identification. For example, the identity of a user may be determined by means of a biometric reader (eye scan, face recognition, fingerprint, voice signature, etc.), or by means of a switch where different positions identify different users, or by entering a user code on a keyboard/keypad, and the keyboard takes on the preferences (short commands, address book, and persona) that is specific to that of the user. A user identity is transferred from the user identification module 403 to the profile determination module 405 which is responsible for finding out the preferences and profile for the identified user.

The profile determination module 405 may obtain the information about the profile from the network communication module 401. The profile is sent from the profile determination module 405 to the profile customization module 407 which may modify the profile further to meet the local characteristics of the device or provide a best mapping of preferences to the device being customized. In some embodiments, the profile obtained from the network by the profile determination module may already include customizations, while in other embodiments the profile may need to be customized further by the profile customization module 407. Other reasons for customizing the profile may include changes in geography, context of operations, or policies imposed on the device usage. The profile customization module 407 generates a configuration for the device to device reconfiguration module 409, which changes the configuration of the device.

System 400 may be adapted for inclusion in any of the devices herein described. For example, system 400 may be included in automobiles that are rented, rooms that are rented, cell phones that are temporarily borrowed, and other devices whose ownership or use changes frequently and have sufficient resources to implement system 400.

Transferring user preferences can be used to create many different usability enhancement solutions, and illustrative solutions have been described herein. A variety of techniques, utilizing dedicated hardware, general purpose processors, firmware, software, or a combination of the foregoing may be employed to implement the present principles. One or more embodiments can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

There are many different scenarios and contexts in which this general approach can be used. One example includes an automobile, and the user preferences can be copied from one rented car to another rented car by means of a network connected store belonging to a car rental company. Alternately, the user preferences may be sent directly to the car from the network.

Other instances of such preferences and customization can be obtained. As an example, a cell phone or other device may detect the identity of a user by means of a biometric reader, or by means of a switch where different positions identify different users, or by entering a user code on the keyboard, and the keyboard takes on the preferences (short commands, address book, and persona) that is specific to that of the user. The preferences of the cell phone can be retrieved from a network operated store managed by the cell phone operator.

In yet another usage, a personal digital assistant (PDA) can use the identity of the user to customize the display language that is used depending on the native tongue of the user. In the case of a military system, different soldiers can pick up the same PDA, and it can be customized in US English for a US member of a US/UK coalition and into UK English for a UK member. A vacuum cleaner can automatically adjust the length of its wand to suit the height of the current user, and the current user can be determined by means of a biometric reader. Many different embodiments can be made in different environments.

Having described preferred embodiments of a system and method for transferring user preferences (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for customizing a device, comprising:
 identifying a user of a device;
 determining a profile for the user of the device from a network, the profile including a record of at least one user preference for a type of the device;
 translating the profile to a configuration of the device; and
 modifying the device according to the configuration to permit use of the device with the at least one user preference,
 wherein determining includes modifying the profile based on a local context.

2. The method as recited in claim 1, wherein the local context includes a current geographic location.

3. The method as recited in claim 1, wherein translating includes adapting the at least one user preference to physical attributes of the device.

4. The method as recited in claim 1, wherein the profile is previously generated by the user and translating includes triggering a download of the profile upon initial use of the device.

5. The method as recited in claim 1, wherein determining includes determining the profile based upon a second device which the user had used in the past.

6. The method as recited in claim 5, further comprising communicating the profile from the second device by the network.

7. The method as recited in claim 1, wherein translating includes a substitute configuration in the event that the device cannot be configured for the at least one user preference.

8. The method as recited in claim 7, wherein the substitute configuration includes simulating the at least one user preference by configuring other parameters.

9. A computer readable storage medium comprising a computer readable program for customizing a device, wherein the computer readable program when executed on a computer causes the computer to perform the steps of claim 1.

10. A method for customizing a configurable entity, comprising:
  determining an identity of a user;
  obtaining at least one preference of the user from a network connected store; and
  modifying a configuration of at least one configurable entity by reconfiguring at least one hardware device in accordance with the at least one preference,
  wherein obtaining includes mapping the at least one preference to a context in which the configurable entity is located.

11. The method as recited in claim 10, wherein the step of obtaining includes mapping the at least one preferences to a type of configurable entity.

12. The method as recited in claim 10, wherein obtaining includes:
  storing the at least one preference from a first used entity where the first used entity is configured by the user; and
  transferring the at least one preference to the configurable entity.

13. The method as recited in claim 10, wherein the local context includes a current geographic location.

14. The method as recited in claim 10, wherein mapping includes a substitute configuration in the event that the configurable entity cannot be configured for the at least one user preference.

15. A computer readable storage medium comprising a computer readable program for customizing a device, wherein the computer readable program when executed on a computer causes the computer to perform the steps of claim 10.

16. A system for customizing a device remotely according to a user preference, comprising:
  a user identification module configured to identify a user of a configurable device;
  a profile determination module coupled to the user identification module and configured to access a user profile over a network based upon an identity of the user and a device type of the configurable device;
  a device reconfiguration module configured to permit reconfiguration of the configurable device in accordance with a user preference stored in the profile;
  a profile customization module configured to map the user profile to attributes of the configurable device, wherein the profile customization module maps the user profile using at least one of local context information and a type of the configurable device; and
  a network communications module configured to send and receive information to and from the user configurable device to obtain the profile from storage over the network.

17. The system as recited in claim 16, wherein the system is located on the configurable device.

18. The system as recited in claim 16, wherein the system is located on the network and in communication with the configurable device.

19. The system as recited in claim 16, wherein the profile determination module accesses the user profile from a previously used device in communication with the network.

20. The system as recited in claim 16, wherein the local context includes a current geographic location.

21. The system as recited in claim 16, wherein the profile customization module applies a substitute configuration in the event that the configurable device cannot be configured for the at least one user preference.

22. The system as recited in claim 21, wherein the substitute configuration includes simulating the at least one user preference by configuring other parameters.

* * * * *